MONOPHONIC-STEREOPHONIC PHONOGRAPH CARTRIDGE

Filed Oct. 31, 1958 2 Sheets-Sheet 1

INVENTOR.
DAVID E. LAUX
BY
W. H. Sprague
ATTORNEY

INVENTOR.
DAVID E. LAUX
BY
W. H. Sprague
ATTORNEY

United States Patent Office 3,102,171
Patented Aug. 27, 1963

3,102,171
MONOPHONIC-STEREOPHONIC PHONOGRAPH CARTRIDGE

David E. Laux, Oaklyn, N.J., assignor to Radio Corporation of America, a Delaware corporation Filed Oct. 31, 1958, Ser. No. 770,958
5 Claims. (Cl. 179—100.41)

This invention relates to phonograph pickups, and more particularly to phonograph pickups operable to transduce the recordings of a record having two separable recordings in the same record groove.

Phonograph records have been proposed which have two stereophonically related signals recorded in the same record groove. With such records the two signals are recorded at right angles to each other in the same record groove, with each being at the same angle, such as 45°, with respect to the record surface. Such a recording system is designed so that the net effect of equal amplitude in-phase signals representative of the information to be recorded is the production of lateral groove undulations and the net effect of equal amplitude out-of-phase signals is the production of vertical groove undulations. A similar effect is obtained by electrically combining the two signals and recording the sum thereof laterally and difference thereof vertically. In either case the lateral groove undulations contain most of the recorded signal information so that the resulting stereophonic record may be acceptably used with existing phonograph systems designed for a record having only a single laterally cut recording in the groove thereof.

One problem encountered in phonograph systems in general, is that low frequency noise referred to as "rumble" is superimposed on the low frequency signals transduced from the phonograph record. Rumble is caused by vertical vibrations originating in the turntable bearings, the turntable motor, the driving assembly and the like. In a conventional laterally cut record having only a single recording in the record groove, rumble can be reduced by proper record player design and by designing the mechanical elements of the phonograph pickup to be substantially unresponsive to vertical vibrations. However, in stereophonic phonograph systems of the type referred to, the pickup must be responsive to both vertical and lateral record groove undulations and, therefore, the susceptibility of the system to rumble is increased.

Accordingly, it is an object of this invention to provide an improved phonograph pickup for records of the type having two separable recordings in the same record groove.

Another object of this invention is to provide an improved phonograph pickup for stereophonic phonograph records of the type described which exhibits optimum translation characteristics for the lateral undulation components which represent most of the recorded signal information, and has reduced response to vertical undulation components including vertical rumble.

In accordance with the invention a pair of mechanical-to-electrical transducing elements, such as piezoelectric crystals, are supported in parallel relation such that the major surfaces thereof lie in vertical planes when the pickup is in the record playing position. Each of the transducing elements is anchored at one end in a compliant block, and the free ends of the elements are connected to a vibration transmitting system including a record groove-tracking stylus. The transducing elements are held in the compliant anchoring block in a manner to permit some slippage therebetween, primarily along the larger cross-sectional dimension of the transducing elements. Since the major surfaces of the transducing elements lie in vertical planes, this slippage is in the direction of vertical vibrations, thereby dissipating some of the vertical movement and reducing the response of the pickup to vertical modulation components including rumble. With the minimum cross-sectional dimension of the transducing elements in the direction of lateral vibrations, maximum lateral compliance is provided and accordingly the translation of lateral modulation components is optimized.

If desired, the pickup embodying the invention may be adapted to transduce recordings from conventional laterally cut 78 r.p.m. records by providing an additional mechanical driving system including a stylus of the proper dimensions to scan 78 r.p.m. records. Since such transducing system is for monaural operation only, the additional mechanical driving system is constructed to resist the transmission of vertical vibrations to the transducing element.

The novel features that are considered characteristic of this invention are set forth with particularity in the appended claims. The invention itself, however, both as to its organization and method of operation, as well as additional objects and advantages thereof, will best be understand from the following description when read in connection with the accompanying drawings, in which:

Figure 2:
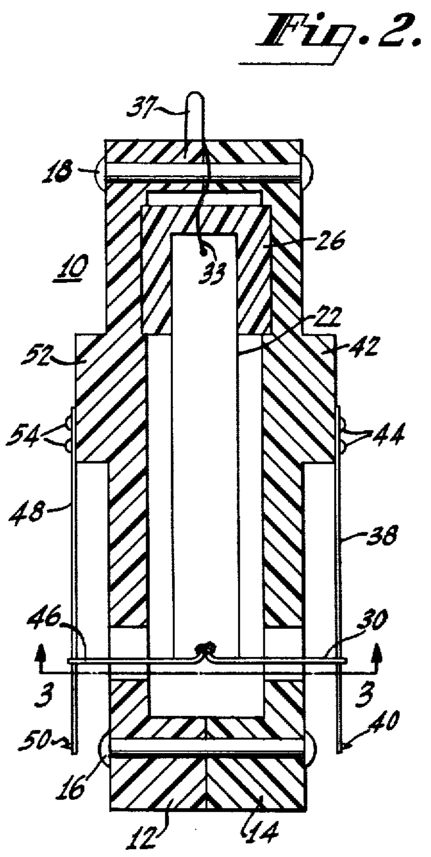
FIGURE 2 is a sectional view taken on the section lines 2—2 of the phonograph pickup shown in FIGURE 1.
Figure 3:
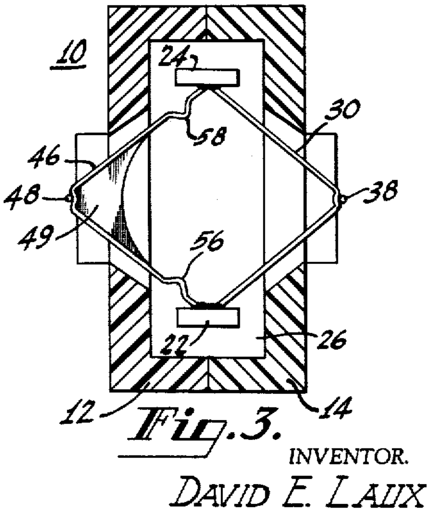
Figure 4A:
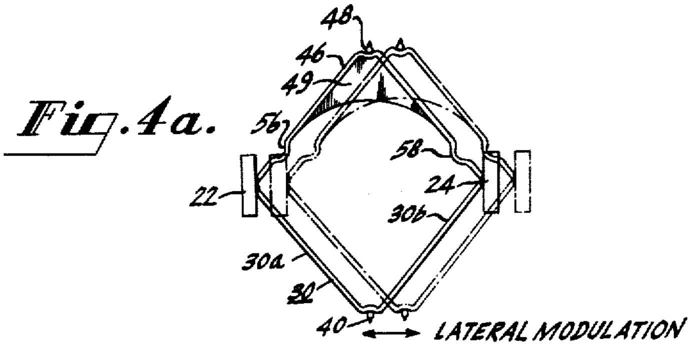
Figure 4B:
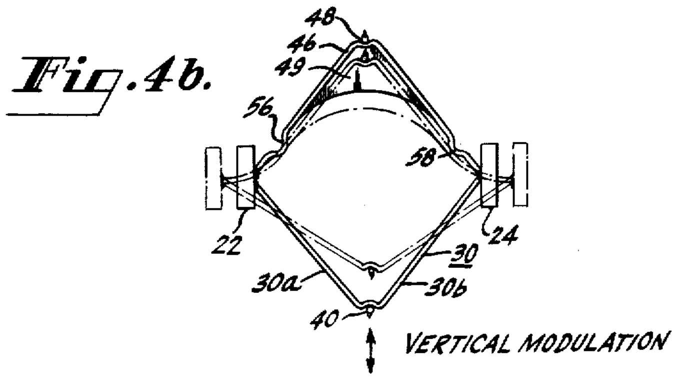
Figure 4C:
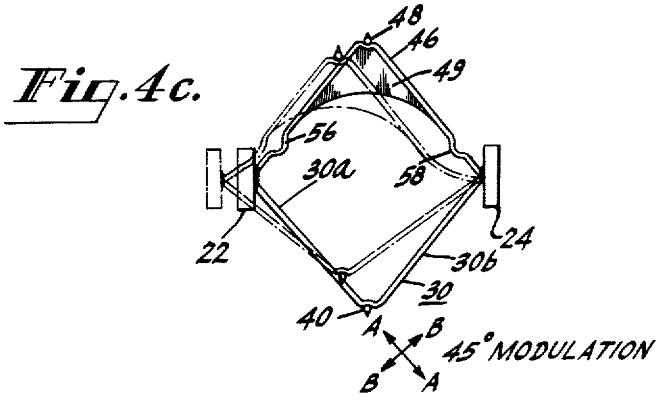

FIGURE 3 is a sectional view taken on the section lines 3—3 of the phonograph pickup shown in FIGURE 2; and FIGURES 4*a*, 4*b* and 4*c* are diagrammatic views indicating the movement of the two transducing elements in response to lateral, vertical, and 45° modulation components respectively.

Figure 1:
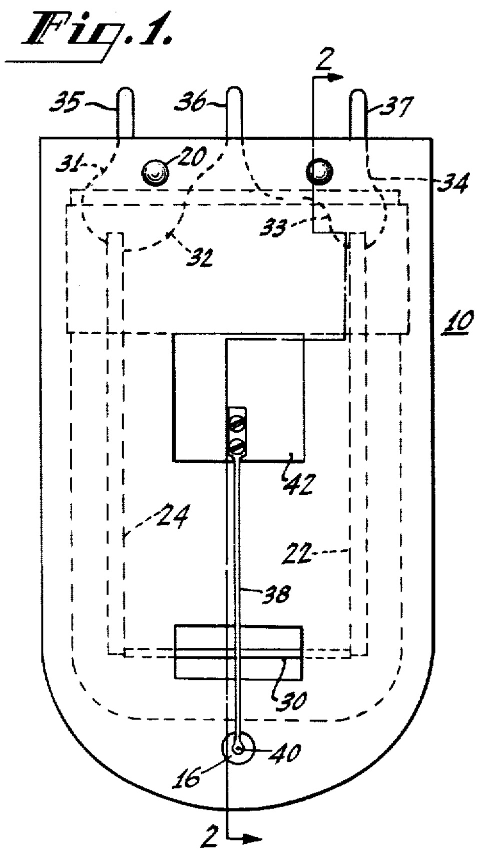
FIGURE 1 is an enlarged plan view from the underside of a phonograph pickup for stereophonic disc records embodying the invention.

Referring now to the drawings wherein like reference numerals will be used to designate the same components throughout, and particularly to FIGURES 1 to 3, a phonograph pickup cartridge 10 constructed in accordance with the invention is adapted to be mounted conventionally near the free end of a pivotally movable tone arm, not shown. The pickup cartridge 10 includes a casing comprised of a pair of molded Bakelite top and bottom sections 12 and 14, respectively, which are held together by the rivets 16, 18 and 20.

A pair of elongated piezoelectric transducing elements 22 and 24 of rectangular cross-section is housed within a cavity formed between the top and bottom casing sections 12 and 14. The transducing elements 22 and 24 may be Rochelle salt crystals or ceramic elements of barium strontium titanate or the like. The major surfaces of the transducing elements 22 and 24 are positioned in vertical planes when the pickup is in a record playing position. One end of each of the transducing elements 22 and 24 is embedded in a compliant damping block 26. By way of example, the damping block 26 may be provided with a pair of suitably shaped apertures for receiving the transducing elements. The dimensions of the damping block 26 are such that, when the casing sections 12 and 14 are forced together by the rivets 16, 18 and 20, sufficient pressure is provided through the damping block 26 to hold the transducing elements 22 and 24 securely in position. With one end of the transducing elements 22 and 24 anchored, vibrations transmitted to the other ends thereof will produce corresponding electrical output signals.

Since the damping block 26 is relatively small in size, the physical properties do not vary appreciably from one end to the other and, therefore, the mechanical effects on the separate transducing elements due to pressure, damping, etc., are substantially the same. For additional damping, auxiliary dampers of Viscoloid or other appropriate viscous damping material may be included in the pickup casing. As is known, the proper combination of the hardness of the damping block 26 and viscosity of any viscous damping, may be used to control high frequency resonances, as well as the low frequency compliance and Q, in order to control the frequency and resonant rise of mechanical impedance of the pickup and the tone arm system.

The transducing elements 22 and 24 are arranged and polarized to produce an output voltage in response to a bending stress applied by a yoke member 30 which extends out of the cartridge casing through an opening in the bottom casing section 14. The yoke 30 is formed of a single piece of material such as piano wire to have a pair of divergent legs and a reentrant central portion. The divergent legs of the yoke member 30 are of a dimension to be stiff axially, but flexible in directions perpendicular to the axis thereof. The ends of the divergent legs of the yoke member 30 are bent over and are cemented or otherwise securely affixed to the free ends of the transducing elements 22 and 24. Vibrations which are parallel to the axis of one of the legs of the yoke member 30 will be readily transmitted through that leg to the transducer to which it is attached. At the same time the other leg will flex and transmit substantially none of these vibrations to the other transducing element.

Electrical connections are provided for the transducing elements 22 and 24 by flexible conductors 31, 32, 33 and 34 which are connected between the various electrodes on the transducing elements and the terminals 35, 36 and 37. One of these terminals such as the terminal 36 may serve as a common terminal for both of the transducing elements. If desired, four terminals may be provided, two for each transducing element. Connections from the terminals 35, 36 and 37 to the phonograph amplifier may be made in the usual manner by conductors extending along the tone arm. Thus, electrical signals corresponding to one of the separable recordings may be derived from the terminals 35 and 36, and electrical signals corresponding to the other recording may be derived from the terminals 36 and 37.

The stylus assembly for the pickup cartridge includes stylus arm 38 one end of which is flattened to support a stylus 40. By way of example, the stylus 40 may have a 0.7 mil radius tip for use with conventional 45 r.p.m. and 33⅓ r.p.m. records. The opposite end of the stylus arm 38 is also flattened, and is affixed to a boss 42 on the bottom casing section 14 by a pair of screws 44. The stylus arm 38 is spring biased into engagement with the reentrant portion of the yoke 30 so that vibrations imparted to the stylus 40 will be readily transmitted through the yoke to the transducing elements. If desired, the stylus arm 38 could be soldered or otherwise affixed to the yoke 30.

If the pickup cartridge is to be used for playing 78 r.p.m. records, an additional stylus assembly including a 3 mil stylus is required for scanning the larger grooves of such records. As shown in FIGURES 1 to 3 of the drawings, provisions for such a stylus and mechanical driving assembly are made by adding an additional yoke member 46 and stylus arm 48. As shown particularly in FIGURE 3 of the drawings, the yoke member 46 is similar in configuration to the yoke member 30 except that it has been considerably stiffened against bending by the addition of a web portion 49 to impede the transmission of vertical vibrations to the transducing elements 22 and 24. The yoke member 46 is provided with a pair of compliant decoupling portions 56 and 58 adjacent the transducing elements 22 and 24 respectively. As will be explained more fully hereinafter, the compliant decoupling portions serve to decouple the yoke member

46 from the yoke member 30. As shown in FIGURE 3, the compliant decoupling portions 56 and 58 are comprised of bends in the legs of the yoke member 46. However, it should be understood that these compliant decoupling elements may take other forms than that shown.

The stylus arm 48 is flattened at one end thereof to support a 3 mil stylus 50. The opposite end of the stylus arm 48 is also flattened and is affixed to a boss 52 which is formed as an integral portion of the top casing section 16 by a pair of screws 54.

The pickup shown in FIGURES 1 to 3 is primarily designed for use with vertical-lateral or 45–45 type stereophonic phonograph records. For example, in a 45–45 type record, one of the recordings (A—A) is cut in the direction as indicated by the arrows A—A (FIGURE 4*c*), and the other recording (B—B) is cut in the direction indicated by the arrows B—B. In other words, in a record having a groove with sides at 45° to the record surface, one recording consists of undulations cut into one wall of the record groove and the other recording consists of undulations cut into the other groove wall. The position of the pickup mechanism including the transducing elements 22 and 24 in the absence of both A—A and B—B recordings is indicated by the solid lines. The stylus 40, in following the undulations (i.e., tracking) of a groove having only the recording A—A, would move back and forth generally in line coincident with the axis of the yoke leg **30*a* which is affixed to the free end of the transducing element 22. Since the leg 30*a* is stiff axially, these vibrations will be directed through the stylus arm 38 and the leg 30*a* to the free end of the transducing element 22** causing this end of the transducing element to bend back and forth, as indicated, for example, by the dotted lines in FIGURE 4*c*. At the same time this motion is generally in a plane perpendicular to the axis of the leg **30*b* of the yoke member 30 which is affixed to the free end of the transducing element 24. Since the leg 30*b* is flexible in directions perpendicular to the axis thereof as mentioned above, the leg 30*b* flexes back and forth with the motion of the stylus arm 38 and causes substantially no bending of the transducing element 24**.

The same action occurs for a recording cut at an angle indicated by the arrows B—B except that the vibrations are readily transmitted to the free end of the transducing element 24 causing it to flex back and forth with negligible bending of the transducing element 22.

With recordings in both channels, the movement of the stylus 40 is complex causing motion which has components that cause bending of both of the transducing elements 22 and 24. For example, if the record groove undulations are vertically disposed, the net effect will be to move the stylus 40 up and down in a vertical plane. This produces equal axial components of motion which are directed along the legs **30*a* and 30*b* of the yoke member 30 so that the free ends of both of the transducing elements 22 and 24 bend equally and corresponding out-of-phase signals of equal amplitude will be derived from the terminals 35 and 37 with respect to the terminal 36**. As indicated in FIGURE 4*b* of the drawings, such upward vertical motion of the stylus 40 causes the transducing elements 22 and 24 to move apart as indicated by the dotted lines causing the legs of the yoke member 30 to spread. On such downward vertical motion the transducing elements 22 and 24 move together with the consequent reduction in the angle between the legs **30*a* and 30*b***.

If the record groove undulations are lateral as indicated in FIGURE 4*a*, then the stylus 40 will move laterally. This produces equal and opposite components of force along the axis of the legs **30*a* and 30*b* causing the free ends of both of the transducing elements 22 and 24 to move in the same direction. Accordingly, equal amplitude signals of like phase will be derived from the terminals 35 and 37 with respect to the terminal 36. For lateral movement of the stylus, the same angle of divergence is maintained between the legs 30***a* and 30*b* of the yoke member 30.

Although the transducing elements 22 and 24 have been shown and described as responsive to bending forces to produce an electrical output signal, it will be appreciated by those skilled in the art that other types of transducers, such as those responsive to twisting or the like may also be used without departing from the scope of the present invention.

Since the major surfaces of the transducing elements 22 and 24 are disposed in vertical planes when the pickup cartridge is in the record playing position, a certain amount of slippage takes place between the transducing elements and the compliant anchoring block 31. This causes a dissipation of some of the vertical movement imparted to the stylus 40 and results in correspondingly decreased movement of the transducing elements 22 and 24. The net effect of such slippage is to reduce the response of the pickup to vertical modulation components including those caused by rumble or other extraneous vertical vibrations.

The transducing elements flex easiest in response to forces directed perpendicular to the major surfaces thereof, in other words, in the direction of the smaller cross-sectional dimension. Since the major surfaces lie in vertical planes, the transducing elements flex easiest, that is, provide the maximum compliance to laterally directed forces. In other words, the pickup exhibits the maximum compliance to lateral groove undulations. This is effective to optimize the output of the pickup for lateral modulation components which comprise most of the signal information of a stereophonic phonograph record, and all of the signal information on existing monaural records. With the pickup construction described above, the larger portion of signal information is transduced with optimum efficiency while those components subject to spurious effects are attenuated sufficiently to reduce the response of the pickup thereto.

For reproduction of monaural records, such as 78 r.p.m. records, the yoke member 46 is constructed to resist changes in angle between the divergent legs thereof. It will be noted that the angle of divergence between the legs of the yoke member 46 remains the same for the various positions of the transducing elements as shown in FIGURES 4*a*, 4*b* and 4*c*. As indicated in FIGURE 4*b* the vertical modulation output is dependent upon the increasing and decreasing angle between the divergent legs of the yoke member to cause the free ends of the transducing elements 22 and 24 to move further apart or closer together. Thus, since the yoke member 46 is stiffened by the web 49 to resist changes in the angle between the legs thereof, the vertical modulation components are almost completely attenuated insofar as their effects on the transducing elements 22 and 24 are concerned.

The pickup cartridge described would normally be mounted for rotation in the end of the tone arm so that one or the other of the styli could be moved into a position facing a record to be played. The yoke member 46 is decoupled from the yoke member 30 by means of the compliant decoupling portions 56 and 58. In other words, in the absence of these decoupling portions the yoke member 46 would prevent the elements from moving independently of each other as the yoke member 30 produces the various types of motion described.

What is claimed is:

1. In a phonograph pickup, means providing a pair of elongated piezoelectric transducing elements of rectangular cross-section, means for supporting each of said transducing elements to permit slippage between the supporting means and the transducing elements in the direction of the greater of the cross-sectional dimensions on a cross section taken perpendicular to the longitudinal axis of said transducing elements, said transducing elements being supported so that the longitudinal axes thereof are parallel and the major surfaces thereof lie in vertical planes when the pickup is in the record playing position, a first yoke member having a pair of divergent legs the ends of which are connected to respective ones of said transducing elements to transmit vibrations thereto, said first yoke member adapted to flex to increase and decrease the angle of divergence between said legs, a first stylus for playing a first type of phonograph records coupled to said first yoke member, a second yoke member having a pair of divergent legs the ends of which are connected to respective ones of said transducing elements to transmit vibrations thereto, said second yoke member being substantially more resistant to flexure of a type tending to change the angle of divergence between the legs thereof than said first yoke member, and a second stylus for playing a second type of phonograph record coupled to said second yoke member.

elongated piezoelectric transducing elements of rectangu-

2. In a phonograph pickup, means providing a pair of lar cross-section, means for supporting each of said transducing elements to permit slippage between the supporting means and the transducing elements in the direction of the greater of the cross-sectional dimensions on a cross section taken perpendicular to the longitudinal axis of said transducing elements, said transducing elements being supported so that the longitudinal axes thereof are parallel and the major surfaces thereof lie in vertical planes when the pickup is in the record playing position, a first yoke member having a pair of divergent legs the ends of which are connected to respective ones of said transducing elements to transmit vibrations thereo, said first yoke member adapted to flex to increase and decrease the angle of divergence between said legs, a first stylus for playing a first type of phonograph records coupled to said first yoke member, a second yoke member having a pair of divergent legs the ends of which are connected to respective ones of said transducing elements to transmit vibrations thereto, said second yoke member being substantially more resistant to flexure of a type tending to change the angle of divergence between the legs thereof than said first yoke member, means providing decoupling elements for the legs of said second yoke member to permit said transducing elements to move independently of said second yoke member, and a second stylus for playing a second type of phonograph record coupled to said second yoke member.

3. In a phonograph pickup, means providing a pair of elongated piezoelectric transducing elements of rectangular cross-section, means for supporting each of said transducing elements so that the longitudinal axes thereof are parallel and the major surfaces thereof lie in vertical planes when the pickup is in the record playing position, a first yoke member having a pair of divergent legs the ends of which are connected to respective ones of said transducing elements to transmit vibrations thereto, said first yoke member adapted to flex to increase and decrease the angle of divergence between said legs, a first stylus for playing a first type of phonograph record coupled to said first yoke member, a second yoke member having a pair of divergent legs the ends of which are connected to respective ones of said transducing elements to transmit vibrations thereto, said second yoke member being substantially more resistant to flexure of a type tending to change the angle of divergence between the legs thereof than said first yoke member, and a second stylus for playing a second type of phonograph record coupled to said second yoke member.

4. A phonograph pickup comprising, a casing, means providing a pair of elongated piezoelectric transducing elements, means for supporting each of said transducing elements in said casing so that the longitudinal axes thereof are substantially parallel, a first yoke member extending from one side of said casing and having a pair of divergent legs the ends of which are connected to respective ones of said transducing elements to transmit vibrations thereto, said first yoke member adapted to flex to increase and decrease the angle of divergence between said legs, a first stylus for playing a first type of phonograph record coupled to said first yoke member, and a second yoke member extending from the other side of said casing having a pair of divergent legs the ends of which are connected to respective ones of said transducing elements to transmit vibrations thereto, said second yoke member being substantially more resistant to flexure of a type tending to change the angle of divergence between the legs thereof than said first yoke member, and a second stylus for playing a second type of phonograph record coupled to said second yoke member.

5. A phonograph pickup comprising, means providing a pair of piezoelectric transducing elements, means providing a first yoke member interconnecting said transducing elements to transmit thereto both vertical and lateral components of motion imparted to said first yoke member, means for mounting said transducing elements relative to said first yoke member so that a pair of signals are generated by said transducing elements in response to said vertical and lateral components of motion, means providing a second yoke member interconnecting said transducing elements but extending in a different direction therefrom than said first yoke member, said second yoke member adapted to transmit lateral components of motion imparted thereto to said transducing elements but be substantially more resistant to the transmission of vertical components of motion to said transducing elements than said first yoke member.

References Cited in the file of this patent

UNITED STATES PATENTS

| | | |
|---|---|---|
| 1,821,836 | Hull | Sept. 1, 1931 |
| 2,114,471 | Keller | Apr. 19, 1938 |
| 2,825,763 | De Vries | Mar. 4, 1958 |
| 2,934,610 | Dieter | Apr. 26, 1960 |
| 2,997,548 | De Vries | Aug. 22, 1961 |

FOREIGN PATENTS

| | | |
|---|---|---|
| 686,777 | Great Britain | Jan. 28, 1953 |

UNITED STATES PATENT OFFICE
CERTIFICATE OF CORRECTION

Patent No. 3,102,171 August 27, 1963

David E. Laux

It is hereby certified that error appears in the above numbered patent requiring correction and that the said Letters Patent should read as corrected below.

Column 6, line 20, strike out "elongated piezoelectric transducing elements of rectangu-" and insert the same after "of" in line 21, same column 6.

Signed and sealed this 31st day of March 1964.

(SEAL)
Attest:
ERNEST W. SWIDER

Attesting Officer

EDWARD J. BRENNER

Commissioner of Patents